United States Patent [19]

Karney et al.

[11] Patent Number: 4,786,084
[45] Date of Patent: Nov. 22, 1988

[54] VOLUMETRIC HOLOGRAPHIC PHOTOCOPY PREVENTION FILM

[75] Inventors: James L. Karney, Sunland; Roland Handy, Northridge, both of Calif.

[73] Assignee: Copyguard, Inc., Calabasas, Calif.

[21] Appl. No.: 799,097

[22] Filed: Nov. 18, 1985

[51] Int. Cl.⁴ .................. G03H 1/24; G03G 21/00
[52] U.S. Cl. ............................ 283/91; 283/85; 283/87; 283/902
[58] Field of Search .............. 283/85, 2, 87, 91, 902

[56] References Cited

U.S. PATENT DOCUMENTS

| | | | |
|---|---|---|---|
| 3,552,853 | 1/1971 | Sanders et al. | 283/86 X |
| 3,887,742 | 6/1975 | Reinnagel | 283/91 X |
| 4,126,373 | 11/1978 | Moraw | 283/86 X |
| 4,171,766 | 10/1979 | Ruell | 283/86 X |
| 4,501,439 | 2/1985 | Antes | 283/86 X |

OTHER PUBLICATIONS

"A First Review of the Properties of Volume Gratings", Volume Holography and Volume Gratings, L. Soly Mar and D. J. Cooke, Academic Press, 1981.
Collier et al., *Optical Holography*, Academic Press, N.Y. (1971), pp. 12–22.
"White-Light Transmission Holograms", Stephen A. Benton, Res. Lab., Polaroid Corp. & Arts and Media Technology Program, Mass. Inst. of Tech. 1983.
"Formation of Optical Elements by Holography", Sincerbox, IBM Technical Disclosure Bulletin, vol. 10, No. 3, pp. 267–268, 8/1967.
"Document Copy Prevention", Queener, IBM Technical Disclosure Bulletin, vol. 18, No. 6, pp. 1717–1718, 11/1975.
"Anti-Copy Paper", Bealle et al., IBM Technical Disclosure Bulletin, vol. 26, No. 5, pp. 2319–2320, 10/1983.

*Primary Examiner*—P. W. Echols
*Assistant Examiner*—Taylor J. Ross
*Attorney, Agent, or Firm*—Staas & Halsey

[57] ABSTRACT

The present invention is directed to a photocopy prevention film applied to a document to be protected that comprises either a volume holographic refraction grating or a surface holographic refraction grating. The refraction grating is bonded to a document and either causes normally scattered light to be focused toward the photoreceptors of a photocopy machine or causes light normally reflected toward the receptors to be scattered away from the receptors. The film is created by splitting a coherent laser beam into a reference beam and a target beam. The target beam reflects off of a special target and onto a photographic emulsion. The reference beam is also incident to the photographic emulsion. The beam reflected from the target and the reference beam create interference planes within the emulsion which can be developed to create differing refractive index planes within the emulsion or etched away to create a surface grating. The beam and target can cause the film to scatter or focus the light depending on whether saturation of the photoreceptors or black-out of the photoreceptors is desired.

1 Claim, 4 Drawing Sheets

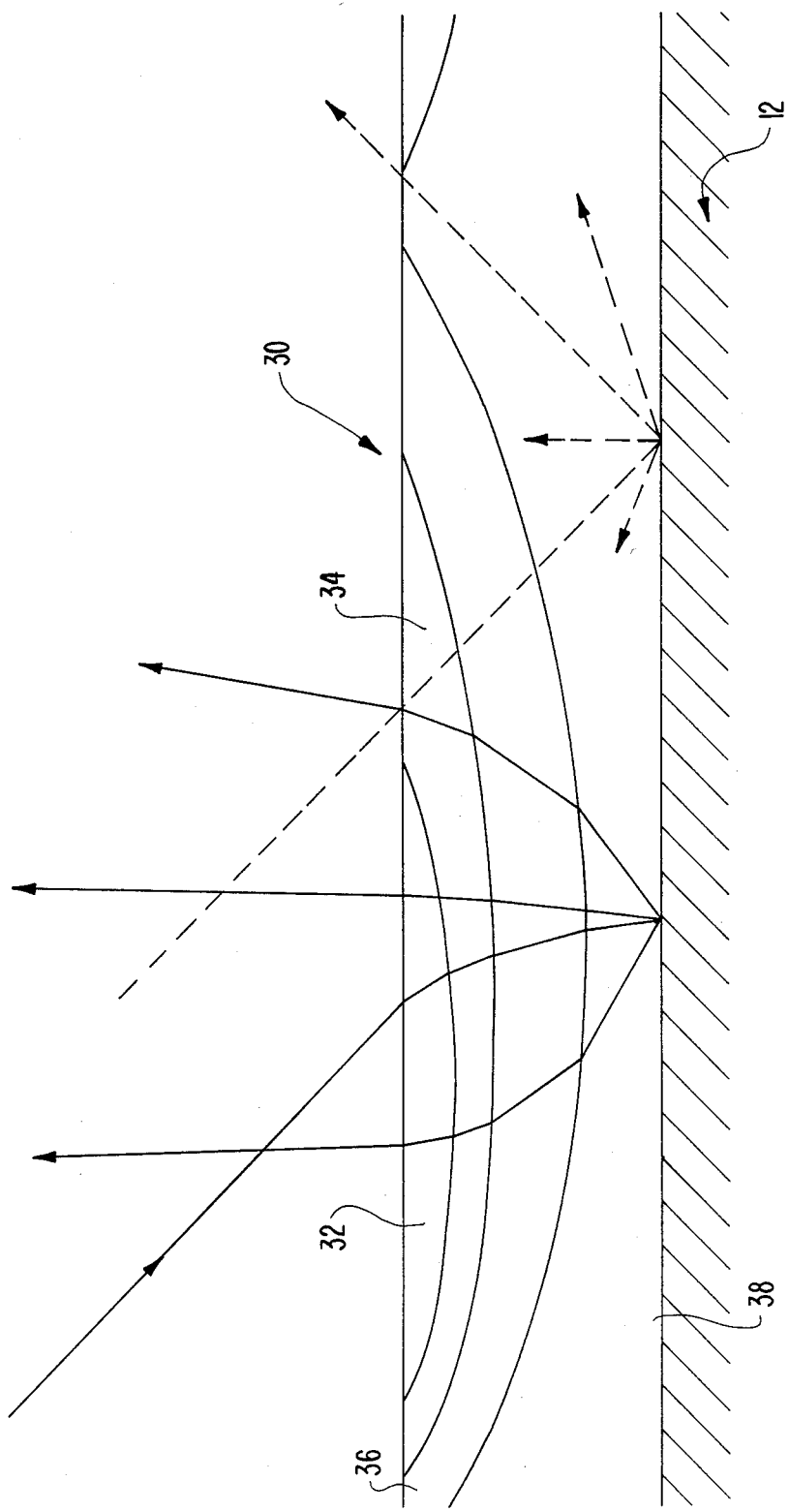

VOLUMETRIC HOLOGRAPHIC PHOTOCOPY PREVENTION FILM

BACKGROUND OF THE INVENTION

1. Field of the Invention

The present invention is directed to a photocopy prevention method and, more particularly, to a photocopy prevention film comprising a volumetric holographic refraction grating fixed to a document along with the apparatus and method for producing a film.

2. Description of the Related Art

The unauthorized copying of classified or confidential documents ia a contemporary problem confronting many government agencies and corporations. FIG. 1 illustrates in general the key elements of a photocopy machine. A lamp 10 broadcasts diffused light onto a document 12 which scatters the light in many different directions. Some of the light is captured by lens 14 and focused onto a photoreceptor drum 16. As illustrated in FIG. 1, much of the light reflected from the document bypasses the lens 14, and as a result, the lamp 10 must produce a very large light flux in order for the lens 14 to capture sufficient light to activate the photoreceptor drum 16. The photocopy machines generally image with a small field angle in the direction of scan and a large semi-field angle of up to 35 degrees in the cross scan direction. The prior art methods of preventing photocopying include special colored papers and overlay materials that mask the original from casual duplication. One such method in which specular aluminum powder is deposited on the document is described in U.S. Pat. No. 4,066,280 to LaCaprica. Unfortunately, the original documents having the prior art copy prevention materials attached thereto suffer from a lack of contrast, making them difficult to read.

SUMMARY OF THE INVENTION

It is an object of the present invention to prevent unauthorized copying of a document while allowing good contrast reading of the document.

It is another object of the present invention to increase the amount of light received by the photoreceptor of a photocopy machine to saturate same.

It is an additional object of the present invention to decrease the amount of light reaching the photoreceptors of a photocopying machine so that no copy can be produced.

It is a further object of the present invention to provide protection from copying in photocopying machines having a field or semi-field angle of at least 35 degrees.

It is an additional object of the present invention to provide protection from copying by photocopy machines using all known wavelengths of light.

It is a further object of the present invention to provide a volume holographic refraction grating suitable for use as a photocopy prevention film.

It is a still further object of the present invention to provide a surface holographic refraction grating suitable as a photocopy prevention film.

It is another object of the present invention to provide a method and apparatus for creating a photocopy prevention film including a master from which duplicates can be made.

The present invention is directed to a photocopy prevention film applied to a document to be protected that comprises either a volume holographic refraction grating or a surface holographic refraction grating. The refraction grating is bonded to a document and either causes normally scattered light to be focused toward the photoreceptors of a photocopy machine or causes light normally reflected off the document toward the receptors to be scattered away from the receptors. The film is created by splitting a coherent laser beam into a reference beam and a target beam. The target beam reflects off of a special target and onto a photographic emulsion. The reference beam is also incident on the photographic emulsion. The beam reflected from the target and the reference beam create interference fringe planes within the emulsion which can be developed to create Bragg planes within the emulsion or etched away to create a surface grating. The Bragg planes are planes of changed refraction index. The target can cause the created film to scatter the light or focus the light depending on whether saturation of the photoreceptors or black-out of the photoreceptors is desired.

These, together with other objects and advantages which will be subsequently described reside in the details of construction and operation as more fully hereinafter described and claimed, reference being had to the accompanying drawings forming a part hereof wherein like numerals refer to like parts throughout.

BRIEF DESCRIPTION OF THE DRAWINGS

FIG. 3 illustrates a volume hologram including internal Bragg planes;

DESCRIPTION OF THE PREFERRED EMBODIMENTS

Figure 1:
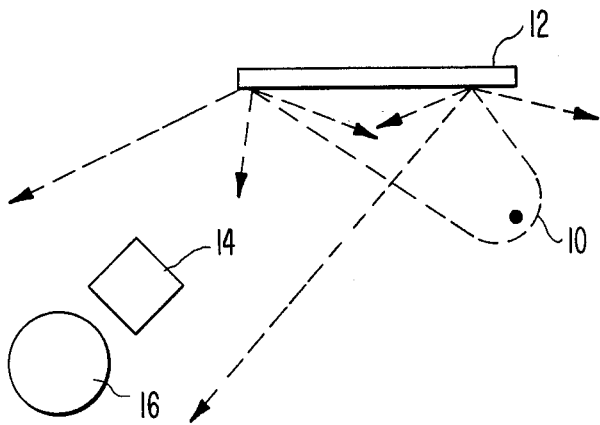
FIG. 1, in general, illustrates the components of a photocopy machine and the manner in which light is reflected from a document 12.
Figure 2:
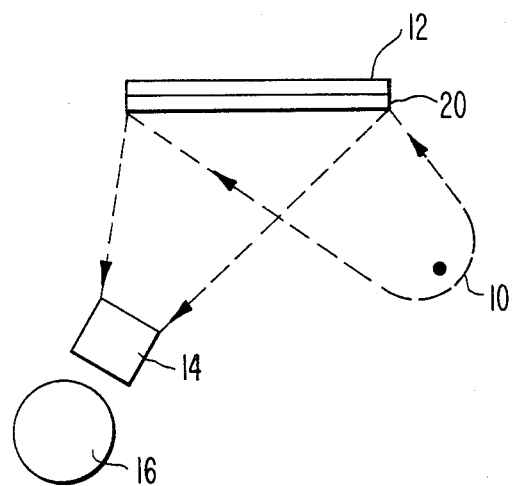
FIG. 2 illustrates the effect on light within a photocopy machine when a photocopy prevention film 20 in accordance with the present invention is attached to the document 12.

FIG. 2 illustrates the effect of the present invention on light in a photocopy machine in a first embodiment which increases the amount of light received by a photoreceptor drum 16 beyond the saturation level by focusing scattered light twoard the lens 14. Diffused light which is transmitted by the lamp 10 passes through the photocopy prevention film 20, reflects off the documents 12 and light which would normally be scattered away from lens 14 is focused toward the lens 14 which focuses the light to the photoreceptor drum 16. By increasing the amount of light received by the photoreceptor drum, the higher background illumination effectively masks the lower signal strength produced by the black print on the document 12. That is, the holographic refraction grating film 20 selectively refracts a significant percentage of scattered light into a preferential angle which increases the light flux incident upon the photoreceptor drum 16, resulting in an all white copy. An alternate version of the present invention, rather than focusing the light toward the lens 14, would enhance the scattering effect and scatter the reflected light outside or away from the preferential angle, that is, outside the cone of reception for the copier lens 14 and result in an all black copy.

Figure 4:
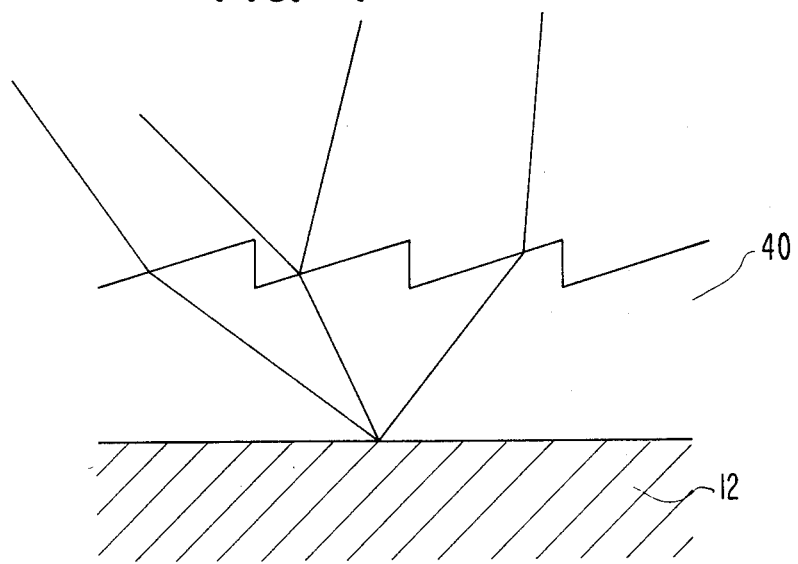
FIG. 4 illustrates a surface holographic grating.

Two types of holographic films 20 on the order of five microns thick can be created in accordance with the present invention and applied to or overlayed on the document to be protected. The first type, illustrated in FIG. 3, is a volume holographic refraction grating and the second type, illustrated in FIG. 4, is a surface holographic refraction grating. In addition, both types can be overlayed and bonded to printed or typed documents.

FIG. 3 illustrates with the dashed lines what usually happens to light incident on a document 12. When the light arrives at the surface of the document, it is scattered in fairly random directions. However, no focusing of the light occurs. The solid lines in FIG. 3 illustrate the path of a light beam passing through a volume holographic grating in accordance with the present invention. When the incident light beam arrives at the surface of the film 30, it enters a first Bragg plane 32 created in the film 30 which is a plane of constantly varying refractive index. Because of this change in refractive index, the light, bends at the boundary between the air and the second Bragg plane 34, which has a refractive index different from the first plane 32, the light is again bent. This process of bending continues through Bragg plane 36, and through unexposed emulsion 38 until it strikes the document 12. The reflected or scattered light rays from the document are bent towards a preferential angle as they pass through the film 30. Thus, the film 30 tends to focus the scattered light toward a preferred angle which causes the photoreceptor in a photocopying machine to be saturated by the background illumination. The preferred angle is a cone of approximately plus or minus 30 degrees to the surface normal and it takes seven or more Bragg planes to achieve the desired preferential angle. If photocopy machines are developed with larger field angles, minor adjustments to the beam radius of the target and thickness of the film will produce a suitable film for the new machines. When the document is viewed with the eye at an angle outside of this cone, that is, at an angle of 60 to 75 degrees from the surface, the visual contrast is sufficient to allow easy reading. The visual contrast lost is approximately 15 to 20 percent.

FIG. 4 illustrates a surface hologram 40 attached to document 12. As can be seen from FIG. 4, scattered light which reflects from the document is also focused toward a preferential angle by the microscopic grooves or planes created on the surface of the film 40. This holographic refraction grating differs from the volume hologram in that the refracting planes are created on the surface of the film 40 by etching off unexposed portions of the emulsion. The surface hologram is less effective than the volume hologram because only one reflection and one refraction are created.

Figure 5:
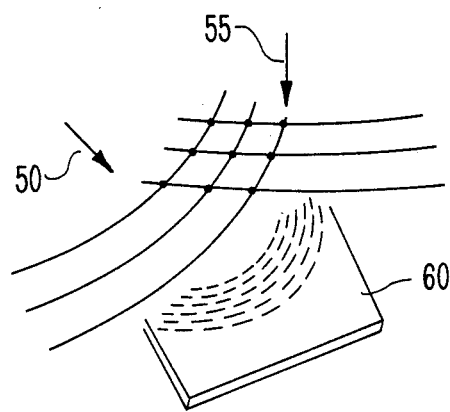
FIG. 5 illustrates, in a perspective view, the creation of interference fringes in a photographic recording emulsion by a reference beam and a target beam.

FIG. 5 is a perspective view illustrating how a light wave 50 from a target interferes with a reference wave 55 to create interference fringes on a photosensitive medium 60. The photosensitive medium applied to the substrate can be any type of photosensitive medium such as silver halide, dichromate gelatin, Polaroid's DMP-128 or a photoresist. The mylar film on which the emulsion is deposited should be a half-mill or less in thickness.

Figure 6:
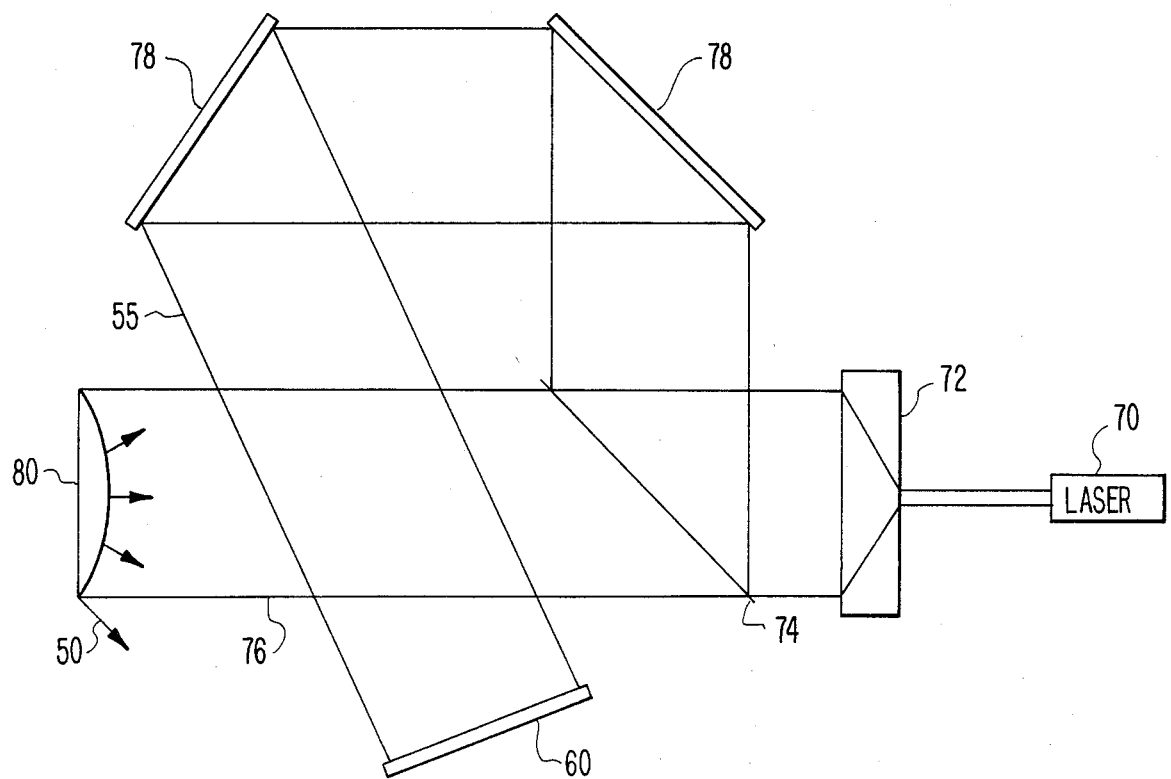
FIG. 6 illustrates an apparatus for producing a photocopy prevention film 20 which saturates photocopy machine photoreceptors.

FIG. 6 illustrates the components of an apparatus for producing a photocopy prevention film which causes the photoreceptors of the photocopy machine to be saturated with scattered background light. A laser 70 projects a coherent collimated beam through a beam enlarger 72 and the beam is split into a reference beam 55 and a target beam 76 by a beam splitter 74. The reference beam is reflected by 100 percent mirrors 78 to the photosensitive medium 60, while the target beam 76 reflects off the target 80 as target wave 50 and is also incident on the photosensitive medium 60. If a saturated photreceptor is desired, it is essential that the coherent beam produced by the laser to be collimated, however, the path lengths of the reference and target beams are not critical. It is also essential that there be no movement or vibration in the apparatus during the recording process. The target 80 can be a large radius sphere having a radius of at least 25 cm or a screen made of retroreflective beads each from 0.1 to 0.2 mm. in diameter. Such a retroreflective bead screen is commonly available as a movie screen. The photosensitive medium after fixation or developing should be approximately 5 microns thick to allow the creation of at least 7 Bragg planes in a single exposure when creating a volume hologram.

Figure 7:
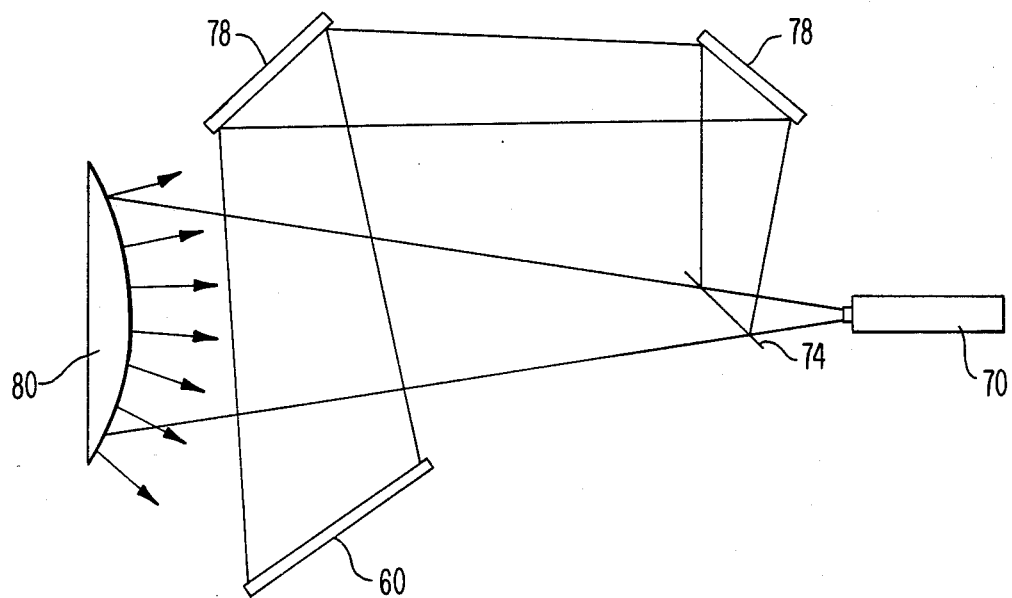
FIG. 7 illustrates a photocopy film creation apparatus which creates a film 20 which reduces the amount of light received by photoreceptors.

FIG. 7 illustrates a configuration used to create a photocopy prevention film which increases the angular reflection of the background radiation so that the photoreceptors in a copying machine receive insufficient light to allow reproduction. In this embodiment, the laser beam is a divergent laser beam diverging in a cone having an angle of at least 5 degrees. Once again, the target can be a large radius sphere or a retroreflective bead screen. If a collimated beam is used, a concave large radium target can be used.

It is possible to either create a film and then attach it to the document using adhesive bonding or otherwise deposit a photosensitive emulsion directly onto the document. If the photo emulsion is sprayed directly onto the document, the document takes the place of the mylar substrate previously discussed. If this direct coating creation method is used, care must be taken to use an emulsion that does not discolor the document. However, the creation of a separate film which is attached to the document is preferred because it allows the film to be mass produced off site and allows a small desk top film bonding device to be used.

Several methods are available for attaching a film to a document. In one method, as the photosensitive medium 60 on a mylar substrate is developed and fixed, it can be transferred to the document to be protected and bonded thereon using an adhesive or a heat sealing process. However, a film production apparatus including the components illustrated in FIGS. 6 or 7, would be very expensive. A preferred alternative to the creation of a film on site would be to create a master from which copies can be created. The copies can then be created on site or at a factory where a large roll of the film can be manufactured.

Figure 8:
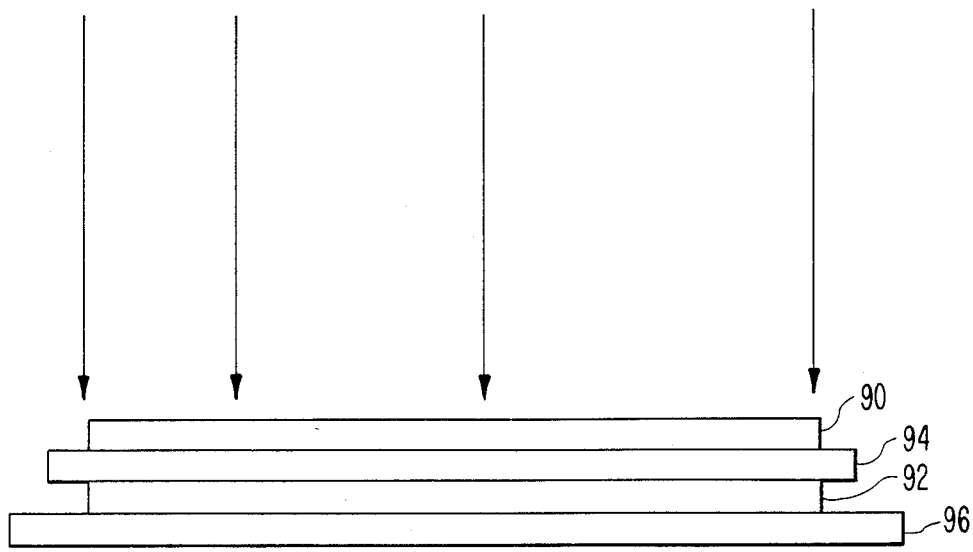
FIG. 8 illustrates a method of creating a volume hologram copy 90 from a master photocopy prevention film 94.

FIG. 8 illustrates an arrangement whereby a copy 90 can be created from a master volume hologram 92. A coherent collimted laser beam is projected through a copy emulsion spred on a mylar substrate, through a glass separator 94 approximately ½ centimeters thick through the master 92 and reflected off of a reflecting surface 96. The wave reflected back through the master 92 and separator 94 creates interference fringes within the copy 90 that are identical to the finges in the master 92. The copy 90 is then developed and fixed in the same manner as the master. The speed with which copies can be made in this fashion depends on the speed of the developing process. A new copy emulsion can then replace the old as the completed copy is wound up on a drum.

A master for a surface holographic refraction grating can be created by photoetching a metal plate using photoresist as the photosensitive medium and etching through the photoresist after exposure. The metal master can be used to thermally emboss a mylar film to create copies of the original.

Once the copies of the photocopy prevention film are created, they can be bonded to a document using a combination of a pressure roller and temperature or with an adhesive and roller in a small desktop unit containing the necessary rollers, heating elements and/or adhesive. The documents which result would be immune from duplication using standard document copiers.

The many features and advantages of the invention are apparent from the detailed specification and thus, it is intended by the appended claims to cover all such features and advantages of the apparatus and method which fall within the true spirit and scope of the invention. Further, since numerous modifications and changes will readily occur to those skilled in the art, it is not desired to limit the invention to the exact construction and operation illustrated and described, accordingly all suitable modifications and equivalents may be resorted to, falling within the scope of the invention.

What is claimed is:

1. A photocopy prevention film applied to a document comprising a holographic refraction grating, attached to the document, said grating adapted to provide a complex refractive index such that, when placed in a photocopy device, the light directed toward the document is substantially totally reflected and/or refracted toward or away from a light receiving device of the photocopy device.

* * * * *